2 Sheets--Sheet 1.

F. ROY.
Sugar-Cane Coverers.

No. 141,464. Patented August 5, 1873.

Witnesses  
Francis V. Deloppet  
Sebastien P. Roy

Inventor.  
Frédéric Roy

2 Sheets--Sheet 2.

F. ROY.
Sugar-Cane Coverers.

No. 141,464. Patented August 5, 1873.

Witnesses.

Inventor.

UNITED STATES PATENT OFFICE.

FREDERIC ROY, OF PARISH OF ST. BERNARD, LOUISIANA.

IMPROVEMENT IN SUGAR-CANE COVERERS.

Specification forming part of Letters Patent No. 141,464, dated August 5, 1873; application filed April 5, 1873.

*To all whom it may concern:*

Be it known that I, FREDERIC ROY, of the Parish of St. Bernard, State of Louisiana, have invented certain new and useful Improvements in Seed Sugar-Cane Coverers; and I do declare the following to be a full, clear, and exact description of the same, reference being had to the annexed drawings with the letters of reference marked thereon and made part of this specification, in which—

Figure 1:
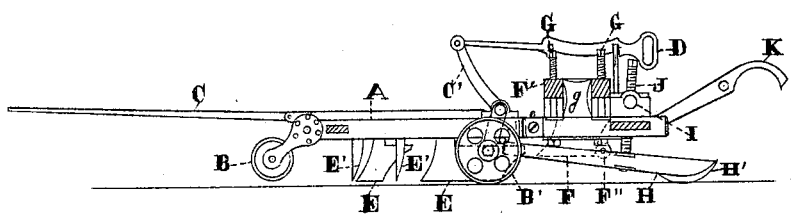
Figure 2:
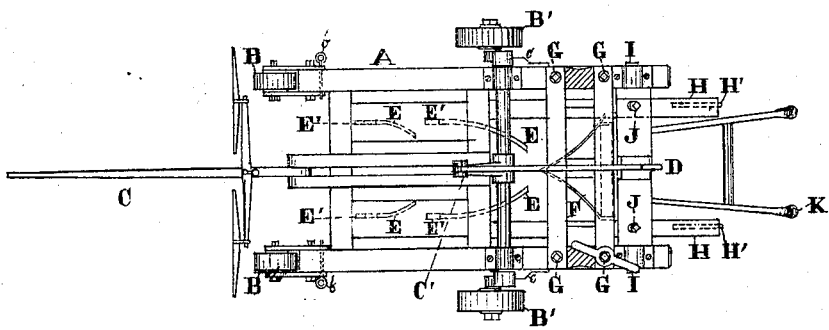
Figure 3:
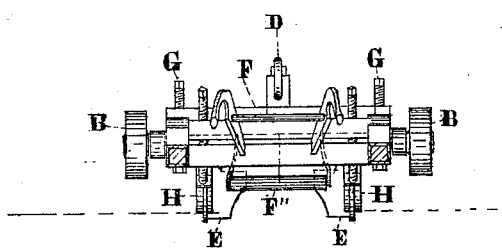
Figure 4:
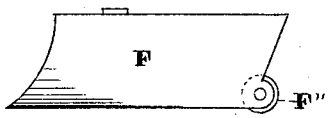
Figure 5:
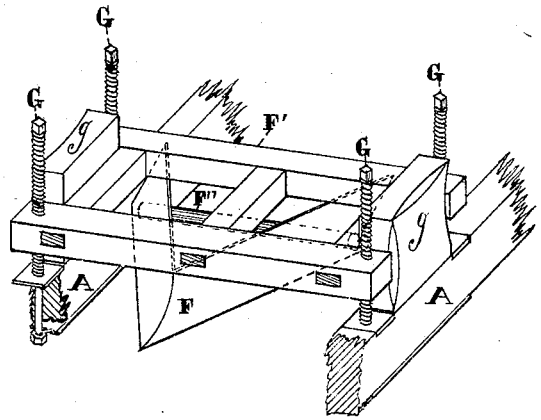

Figure 1, Sheet 1, is a side view of my coverer. Fig. 2 represents a plan of the same. Fig. 3 is a rear view. Fig. 4, Sheet 2, is a side view of the coverer, regulator, or leveler, with a roller attached. Fig. 5 is a detached view or broken perspective view of the vertically-adjustable frame bearing the leveler and other attachments, showing general arrangement.

The object of this improvement is to furnish a cheap and reliable apparatus, whereby seed sugar-cane can be covered quickly, and the thickness of the layer of earth on top of the cane can be regulated or controlled at will, at one operation and more rapidly than has heretofore been done.

The value and importance of this invention will be readily understood by adverting to the fact that seed sugar-cane, which consists of full-size cane cut in short pieces, is laid lengthwise in straight and parallel furrows or trenches made in the plowed ground about six inches in depth, so as to protect it from the drought or cold of winter, to which this plant is very sensitive.

The operation of covering seed sugar-cane has hitherto been usually done by hand labor and with the hoe, which at the present time is very unreliable and costly; this operation can now be done with rapidity and economy, by means of my improved apparatus, which will also permit the young plants to germinate and come up in a more uniform manner than when it is done by the hoe.

I am aware that Letters Patent have been granted to John Tweedy, of Vernon, Illinois; but my improvement is for a different purpose, and is different in its operation and construction in several particulars—notably in the elevation and depression of the several parts presently to be described.

In all of the figures like letters indicate corresponding parts.

In order to enable others skilled in the art to understand my invention, I will now describe its construction, which is as follows:

A represents a parallelogram-shaped frame, seven feet and a half in length by four and a half in width, made of strong material, preferably tough wood. The whole is mounted or hangs on a central axle and wheels, B', the object of this being to move the coverer about when not in use, so as not to scrape the ground. B B represent two movable wheels and their axes and standards, which are fastened at the front end of the frame and on each side of the side pieces. *b b* represent pins provided to hold the wheel-mountings at the proper elevation or depression. C is the tongue and whiffletree, to which the animals are attached. C' is the lever which serves to acturate the wheel and axle. D is the handle provided for that purpose. E E are the mold-boards made of light wrought, cast-iron, or steel. E' E' are the colters setting in front of and in line with the front ends or points of the mold-boards, the whole being firmly secured from above to a longitudinal wooden piece forming part of the frame A. F is the coverer, regulator, or leveler, shown in Fig. 1 in dotted line, and firmly secured to the small vertically-adjustable frame. F' is the small frame, which is adjustable to the proper degree. F'' is a small roller, provided so as to smooth up and harden the top of the row after it is deprived of its surplus earth by the leveler. G G G G are vertical screws pivoted into the frame A, in the manner shown in Fig. 5, and which serve to elevate or depress the small frame F'. This enables me to regulate the thickness or layer of earth on top of the seed-cane at will. *g g* are vertical wooden standards fastened endwise into the large frame, as shown, so as to guide and maintain in position the small frame as it is elevated or depressed. H H are wooden runners, pivoted or hinged at one end near the central part of the main frame underneath, as shown, and the other ends of which rest on the ground in the manner of a sled. H' H' represent thin metal pieces inserted underneath the ends of the runners, so as to prevent slipping sidewise. I I represent a cross-piece of wood fitted with journals at each end, so as to suit the vibrations of the screws J J, which serve to elevate or depress the after part of the machine. K represent the handles by which the machine is held and guided like a plow.

I will now describe the mode of operation. In going to a field the apparatus rests on the central axle and elevated from the ground, as represented in Fig. 1, Sheet 1, and with the right-angled arm resting against two heel-pieces, c c. The machine is then placed in front of a row of cane so as to straddle it, keeping the animals on each side of the row of cane; then unhook the handle D, which will cause the apparatus to drop to the ground by gravity; draw the handle D toward the handles K until the second notch is engaged and the wheels consequently elevated from the ground, as shown in Fig. 3; then adjust the small frame F' by turning the vertical screws G, also adjust the fore-wheels by the pins b b, and the back runners by the vertical screws J J, and then go ahead. The forward motion of the machine will cause a ridge to be made of the shape shown in the rear view of the mold-boards, Fig. 3. Arriving at the end of the field stop one instant; unhook the handle D; the wheels B' will fall to the ground; then lift slightly the machine by the handles until the wheels by their weight will cause the first notch to be engaged; put the machine again in position as at first in front of a row, raise the wheels as before in the first operation, and go ahead again.

Having thus described my invention, and the manner in which it may be carried into useful effect, what I claim as new and useful, and desire to secure by Letters Patent, is—

1. The combination of the frame A with the mold-boards E E, regulator or leveler F, together with its vertically-adjustable frame F', its roller F'', standards g g, and vertical screws G G G G, substantially as described and shown, and for the purpose set forth.

2. The combination of the wheels and axle B', lever C', handle D, runners H H', screws J J, oscillating cross-piece I with fore-wheels B B with their mountings, all constructed and operating together substantially as described and shown, and for the purposes set forth.

FREDERIC ROY.

Witnesses:
   FRANCIS V. DE COPPET,
   SÉBASTIEN P. ROY.